(12) United States Patent  
Choe (10) Patent No.: US 7,089,883 B2
(45) Date of Patent: Aug. 15, 2006

(54) WALL MOUNTED AQUARIUM SYSTEM (76) Inventor: Man U K Choe, 5002 Kenerson Dr., Fairfax, VA (US) 22032

( * ) Notice: Subject to any disclaimer, the term of this patent is extended or adjusted under 35 U.S.C. 154(b) by 0 days.

(21) Appl. No.: 10/780,491

(22) Filed: Feb. 17, 2004

(65) Prior Publication Data

US 2005/0178339 A1    Aug. 18, 2005

(51) Int. Cl.
*A01K 63/00* (2006.01)
(52) U.S. Cl. .................... 119/257; 119/245
(58) Field of Classification Search .......... 119/245, 119/246, 247, 248, 256, 257, 269; 49/404; 248/489, 674, 475.1
See application file for complete search history.

(56) References Cited

U.S. PATENT DOCUMENTS

| | | | | |
|---|---|---|---|---|
| 3,276,428 A * | 10/1966 | Burch | ............ | 119/257 |
| 3,797,459 A * | 3/1974 | Harris | ............ | 119/245 |
| 4,136,638 A * | 1/1979 | Fedor | ............ | 119/257 |
| 4,187,642 A * | 2/1980 | Morinaga et al. | ............ | 49/406 |
| 4,455,011 A * | 6/1984 | Levine | ............ | 248/674 |
| 4,967,694 A * | 11/1990 | Waldman | ............ | 119/246 |
| 5,435,270 A * | 7/1995 | Newman | ............ | 119/257 |
| 5,452,139 A * | 9/1995 | Schrott | ............ | 248/475.1 |
| 5,878,694 A * | 3/1999 | Irwin | ............ | 119/246 |
| 6,018,913 A * | 2/2000 | Lin | ............ | 49/414 |
| 6,041,739 A * | 3/2000 | Caradant | ............ | 119/247 |
| 6,886,799 B1 * | 5/2005 | Yamanashi | ............ | 248/674 |
| 2004/0103601 A1 * | 6/2004 | Bergqvist | ............ | 52/284 |

* cited by examiner

*Primary Examiner*—Teri Pham Luu
*Assistant Examiner*—Elizabeth Shaw
(74) *Attorney, Agent, or Firm*—Jagtiani & Guttag (57) ABSTRACT

A wall mounted aquarium, is constructed from a structural material frame and a glass aquarium mounted within the frame. Preferably, the structural material is a metal that can be welded, such as steel. Structural polymeric materials and composites now known and hereafter developed, can be used. The structural material frame has a front side and a rear side. Preferably, it is formed from a pair of vertically oriented "U" shaped channel members. A horizontal "U" shaped channel member and the pair of vertical "U" shaped channel members are bonded together to form a "U" shaped frame unit. The "U" shaped channel members open inwardly. A glass aquarium having five sides and an open top end is mounted within the frame. One of the sides is a front side, one of the sides is a bottom side, one of the sides is a rear side and two of the sides are ends. The channel members can be tubular or have an open "U" configuration.

32 Claims, 11 Drawing Sheets

WALL MOUNTED AQUARIUM SYSTEM

FIELD OF THE INVENTION

The invention relates to aquariums and more particular to aquariums having an extremely long and narrow open end.

SUMMARY OF THE INVENTION

Wall mounted aquariums have been recognized as being desirable products, because of the extreme aesthetic appeal, the ease of accommodating a large aquarium in wide range of room configurations, and the extreme ratio of viewing area to tank volume. A seven-foot by two-foot aquariums provides fourteen square feet of viewing area, whereas a conventional aquarium of the same volume would provide less than a third as much viewing area.

A wall mounted aquarium, is constructed from a structural material frame and a glass aquarium mounted within the frame. Preferably, the structural material is a metal that can be welded, such as steel. The term welded, as employed herein, is used in its generic form to indicate a bonding or fusion of individual components into a unitary structure. The term weld is commonly applied to the process of joining materials, typically metals, by applying heat, sometimes with pressure and sometimes with an intermediate or filler metal having a high melting point. The term is also used broadly in the sense of bring into close association or union. Plastics can be bonded by the process of solvent welding, which process employs a solvent to partially dissolve or softened two plastic components and fusing the components during the evaporation of the solvent. Structural polymeric materials and composites now known and hereafter developed, can be used.

The structural material frame has a front side and a rear side. Preferably, it is formed from a pair of vertically oriented "U" shaped channel members. A horizontal "U" shaped channel member and the pair of vertical "U" shaped channel members are bonded together to form a "U" shaped frame unit. The "U" shaped channel members open inwardly.

A pair of upper planar members is situated in parallel vertical planes and has a pair of horizontally elongated sides and a pair of vertical ends. Each planar member has each vertical end bonded to a vertical "U" shaped channel member. A glass aquarium having five sides and an open top end is mounted within the frame. One of the sides is a front side, one of the sides is a bottom side, one of the sides is a rear side and two of the sides are ends. Each of the planar members are spaced apart a distance sufficient for the aquarium to be positioned between the pair of upper planar members.

The channel members can be tubular or have an open "U" configuration. The "U" channel can have substantially right angle corners, or rounded corners. The open end of the "U" can be closed with a hinged member, thus forming a closed "U" channel. The hinged chamber that is formed can house aquarium apparatus, such as the air pump, water pump, electrical power bar, and the like. The tubular embodiments preferably employ a rectangular tube.

Preferably, the structural material is metal the frame is rigidified through the use rigidifying members, advantageously, angle bars, or angle irons. The frame rigidifying members can include a first set of at least two side planar members. Three "U" shaped channels, in combination with an upper planar member form a picture frame-like structure and overlies the face side of the aquarium, as a picture frame overlies a picture. The structural components of the structural material frame are preferably welded together to form a unitary structure. The structural materials that can be used include stainless steel, polymeric composites, titanium and the like. Since it is preferred to form the frame from a plurality of components, as compared to a single molded structure, the material of construction must be susceptible to being fused into a unitary structure.

A decorative frame member is fixed to the structural metal frame member and provides a picture frame structure with the aquarium being visible in the window of the frame and the structural frame being hidden from view. The decorative frame member has a plurality of elongated grooves, each of the elongated grooves being dimensioned and positioned to receive one flange element that extends from a channel member.

A pair of "U" shaped decorative panel receiving members can be fixed to the structural frame rear side, with the open ends of the "U"s facing each other and being positioned horizontally and dimensioned to receiving a decorative panel member. A decorative panel member can be removably positioned within the "U" shaped decorative panel receiving members. The pair of "U" shaped decorative panel receiving members can be welded to the structural material frame thereby rigidifying the frame. The panel receiving members can also be formed of "L" shaped angle members that are welded to the rear of the frame, thereby forming a pair of "U" shaped channels for receiving a decorative panel.

A plurality of spacer elements is positioned between the pair of planar members for the purpose of fixing the planar members at a predetermined separation distance. Each of the spacer elements have a first end affixed to the rear side of the structural metal frame and a second end affixed to the front side of the structural metal frame, at a position proximate the open top end of the glass aquarium, whereby the top, open end of the aquarium is protected against flexure forces.

The wall mounted aquarium has outside dimensions of between 4 and 5 inches, by at least two feet, by at least three feet and the aquarium has a capacity of at least 30 gallons. The dimensions are exclusive of the decorative wood frame and mounting rails. That is, these dimensions are the outside dimensions of the aquarium and frame structure. It has been found that the corresponding interior dimensions are essential in order to provide sufficient air/water interface for a tank containing from about 15 to about 35 gallons of water. The preferred interior dimension is from at least about 3.5 inches to about 4.5 inches. Preferably, the aquarium has a capacity of at least 30 gallons and the aquarium has a length of at least six feet. The resultant tank will typically contain in excess of 150 pounds of water and up to about 250 pounds of water. It is thus evident that both the design of the structural support frame and the mechanism for affixing the frame to a wall, are critical.

The mounting system preferably includes a pair of mounting rails, each of which are "U" shaped members having a pair of legs, an open end and a closed end. The mounting rails are threadedly fastened to a wall as for example, with stainless steel fastener consisting of a threaded pin or rod with a head at one end. The head is preferably a hexagonal member or a tapered head having a rectangular slot or hexagonal slot for receiving the driving end of a screwdriver. The Robertson square recess screw is preferred. The pin or rod section can have a tapered screw or non-tapered bolt type of configuration. Preferably, a hole is predrilled in a wall stud, and torque is applied to the head of the fastener to drive the threaded pin section into the stud. Preferably, each rail is connected to each stud with a pair of screws, thus providing eight screws for each rail, in a seven-foot wide aquarium system. In the case of a wall that has metal studs, rather than wooden studs, it is preferred to affix a rectangular wooden panel to the metal studs and then to attach the mounting rails to the wooden mounting panel rather than directly to studs. In this manner, the mounting panel can be attached to each metal stud with no less than six screws, and preferably more than six screws. The mounting rails are affixed to the wall or mounting panel with their open end against the wall or mounting rail.

A plurality of threaded rods are fixed at one end to one of the mounting rails and affixed with two pairs of nuts to the structural metal frame. In a preferred embodiment, a first nut is positioned on the threaded rod and within the U of the rail. A second nut is threaded on the rod, on the opposite side of the rail, thus fixing the position of the rod on the rail. The rod passes through a rod receiving hole in the frame, thus positioning the frame on the wall. A third nut is positioned on the rod on the interior side of frame, such that the frame is locked between two nuts. Preferably about four threaded rods are provided for each rail. The same procedure is followed for the upper and lower rails.

Spacer members are situated between the upper vertical plain members. The spacer members include a threaded rod and a plurality of nuts. A pair of nuts cooperating to maintain the vertical plane members spaced apart by a minimum distance and a pair of nuts cooperating to maintain the vertical plane members spaced apart at a maximum distance. Stated in another way, each of the planar members is locked between a pair of nuts. The spacers serve to rigidify the vertical plane members against flexure thus reinforcing the frame in the region of the upper, open end of the aquarium.

DESCRIPTION OF THE EMBODIMENTS OF THE INVENTION

The problem exists that water and glass are heavy and it is difficult or even dangerous to mount a glass fish tank on a wall. Typically, aquariums have been limited to less than 20 gallon size and ideally, less than 10 gallons. One of the ways of keeping the tank volume low is to have the tank extremely narrow, as for example, no more than three inches. Another weight saving technique is the use of non-glass materials, such as acrylics, and other transparent or translucent materials. The problem with polymeric aquariums is that the material is prone to being scratched, and scratches form sites for bacterial growth.

The clarity of glass is clearly advantageous, but a forty-gallon tank form of glass would increase the weight of the aquarium greatly, as compared to a plastic tank.

Another problem that would be encountered in mounting a heavy tank is the difficulty of lifting the tank onto some form of hanger that has been mounted on the wall.

A further problem is the inability of a mounting mechanism to support hundreds of pound of water, tank and support mechanism. The problem of providing sufficient surface area for optimum water-air interface is exacerbated by the fact that the wider the tank, the greater the cantilever action and the more stress that is put on the mounting system. Additionally, the system must be able to accommodate unexpected events, such as a young child grabbing the top of the tank and hanging from the top edge in an effort to have a close look at the fish. As previously noted, the wider the tank, the greater the force that will be applied by the weight of the child.

It has now been found that the problems can be effectively addressed by employing a mounting system that include a pair of mounting rails having a plurality of threaded bolts extending from each mounting rail. The mounting rails are bolted to the wall, preferably by means of screws in the metal or wood studs in the wall. The studs are normally on 16-inch centers, and the rails can be secured to the studs at 16 or 32-inch intervals, preferably with the use of a pair of screws per stud, per rail. In the case of metal studs, it is preferable to secure a mounting panel, as for example of exterior grade plywood, to the studs. This mechanism facilitates, or enables the use of a greater number of screws per stud. The rails are then secured to the mounting panel. The aquarium is supported in a rigid frame, preferably of metal, such as stainless steel, or other rigid, structural material that is reasonably impervious to water corrosion. It should be noted that the material of preference for the screws, bolts, frame and similar parts is stainless steel. The frame includes an upper and lower planar member that has a plurality of holes positioned to receive the bolts of the mounting rails.

Nuts are threaded on to the bolts after the frame/aquarium combination is positioned with the bolts projecting through the mounting holes. The rigid frame is picture frame like in the front, but in the back, can have support struts for increased rigidity. In the event the system is to be used with a removable picture panel between the tank and the wall, the rear frame member must be picture frame-like, in the same manner as the front frame member. The loss of the support member preferably used with the rear frame member can be advantageously negated or countered by the use of an angle member that provides both structural rigidity and a channel for the removable picture. The angle member can have the shape of a "Z" or an "h". The "Z" shape element is provided with 90° interior angles, for a stair-step configuration. The angle member is advantageously bonded or locked to the rear frame member as by welding, or the like, such that the frame member cannot move independently of the angle member. In some embodiments, the bolting of the elements together is sufficient to provide the requisite rigidity.

The front and rear frame members are fixed to a bottom "U" shaped angle member. The "U" shaped angle member is provided with elongated holes for receiving the bolts of the lower mounting rail member. The elongated holes can be horizontally or vertically oriented. The rear frame member has, at its upper end, elongated holes for receiving the bolts of the upper mounting rail member. The elongated holes can be horizontally or vertically oriented. Advantageously, one of the upper or lower members has it holes oriented for vertical adjustability and the other has its holes oriented for horizontal adjustability.

The overall frame structure advantageously, further included right and left side "U" shaped angle members for accommodating such accessories as an electrical surge protector, a timer, an air pump, a water pump, power lines, filtration components or other optional accessories.

In another embodiment, the aquarium is employed as an advertising media. In this embodiment, the previously noted removable picture panel between the tank and the wall, displays advertising matter. It has been found, that customers can spend time in a retail establishment without noticing advertising displays, but are captivated by the activity in an aquarium. By positioning the advertising display such that it is viewed through the fish tank, customers tend to not only have an increased incidence of noticing the advertisement, but will study the information contained in the advertisement.

The use of such an arrangement for advertising is both entertaining for the customer and highly informative. For example, in a facility such as an automobile dealership, the availability of various car options, features or advantages can be effectively brought to the attention of customers. In such an application, it is highly advantageous that the advertisement be periodically changed or updated.

Crossbars or braces are advantageously employed between the upper sections of the front and rear frame members such that a force applied to the front of the tank, as for example by leaning against the frame, are transmitted to the rear frame member. It is essential that the tank's glass not be subject to being squeezed together at the center of the tank. The long span of the glass is sensitive to a flexing force in the central region of the upper section between the right and left sides of the tank. The bottom section is far less vulnerable to flexing, due to the presence of the bottom sheet of glass and the bottom "U" shaped channel member. Since the top of the tank must be open, bracing between the front and rear glass panel is an important feature. Preferably, the bracing includes a central cylindrical member having internally threaded recesses for accommodating thread bolts or screws. The front and rear frame members are provided with holes to accommodate the aforenoted bolts or screws. Alternatively, the brace can have an unthreaded central channel for receiving a bolt that passes through the channel.

Figure 1:
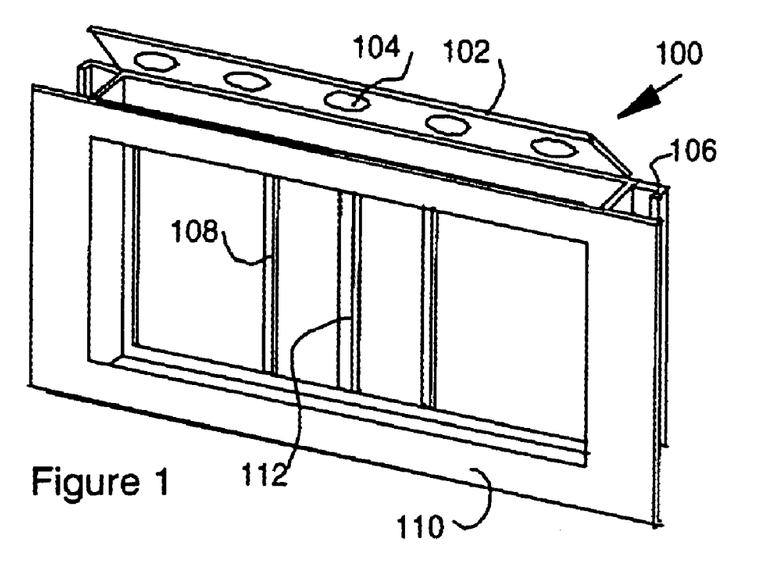
FIG. 1 is a schematic illustration of a frame structure for a wall mounted aquarium.
Figure 2:
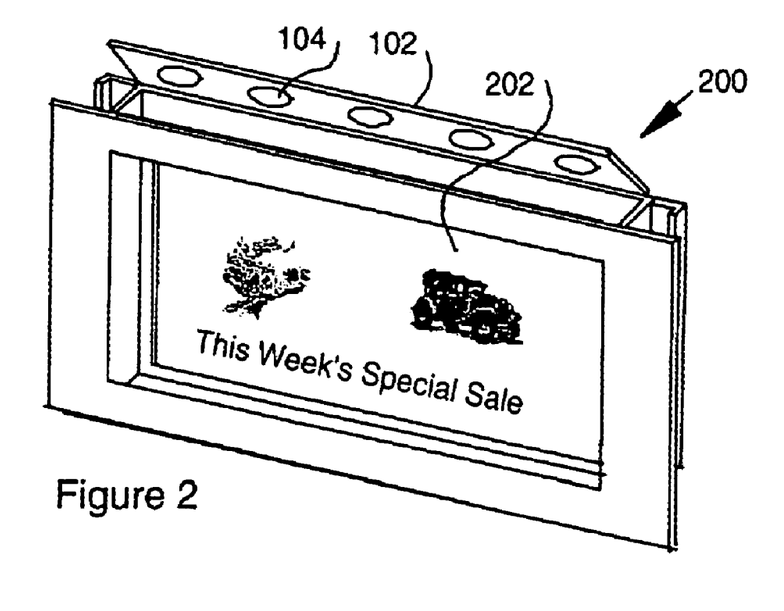
FIG. 2 is a schematic illustration of another embodiment of a frame structure for a wall mounted aquarium having a removal illustration panel.

FIG. 1 shows a frame structure, indicated generally as 100, for a wall mounted aquarium system. A hinged top panel 102 contains a plurality of vent openings 104. The frame is formed of a pair of picture frame units 106 and 110. Support struts 108 and 112 are provided to optimize the structural rigidity of the frame. Preferably, the frame is form from a plurality of angle elements that are welded together to form the unitary frame structure.

Figure 5:
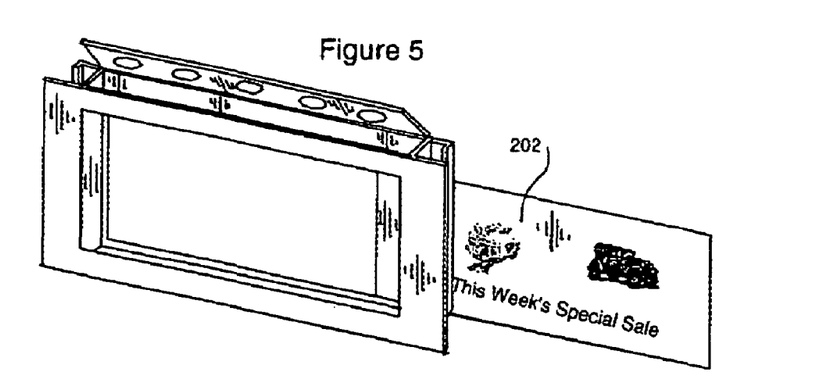
FIG. 5 is a perspective illustration of another embodiment of a frame structure of FIG. 2, showing the illustration panel partly removed.

In another embodiment, a frame structure indicated generally as 200 is designed without the vertical support struts 108 and 112, but rather is provided with parallel tracks for removably supporting a decorative member 202. Where the aquarium is located in a commercial establishment, such as a retail automobile dealer, the decorative panel 202 can be illustrated with advertisements. It has been found that customers frequently do not notice in-store advertisement displays. However, generally people are captivated by the image of live fish in an aquarium. By placing the advertisement behind the glass of the aquarium, it has been found that people will not only notice the ad, but will read it carefully and for a substantial period of time. The elimination of the rear vertical struts 108 and 112 requires that the frame be provided with reinforcement mechanisms that do not obstruct the view of the panel. Various embodiments and details of strutless rigidity designs are shown in FIGS. 13 to 19. As illustrated in FIG. 5, the panel 202 can be removed horizontally from the frame when it is desired to change the decorative or advertising material.

Figure 3:
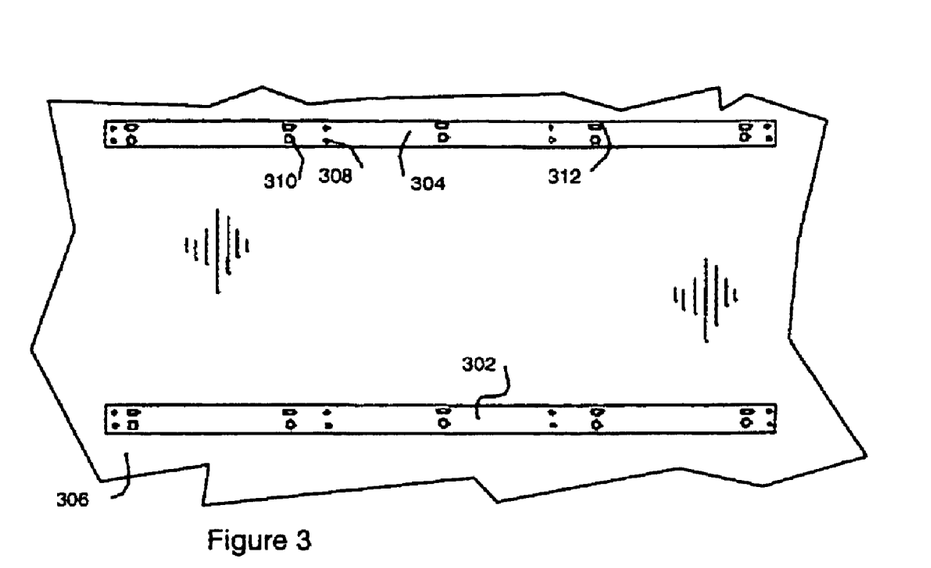
FIG. 3 is fragmentary illustration of a wall with a pair of mounting rails.

As a first step in mounting the wall mounted aquarium, a pair of horizontal rails 302 and 304 are secured to the wall. The rails are secured to the studs in the wall by means of pairs of stainless steel bolts or screws 308. In the case of an 84-inch frame, ten screws are provided for each rail. This is based on the structure being attached to five studs at 16 inch centers, and two screws per stud. Elements 310 are bolts that are employed to secure the front and rear frames together at a fixed distance. This minimizes the risk of the aquarium glass being broken if pressure is applied in the direction of the wall, at a point along the top of the frame, particularly, at a midway point between the right and left ends. Oval or elongated holes 312 are provided for bolting the upper and lower rails to the frame. One set of holes has it major axis horizontal and the other has it major axis vertical. This provides for horizontal and vertical adjustability.

Figure 4:
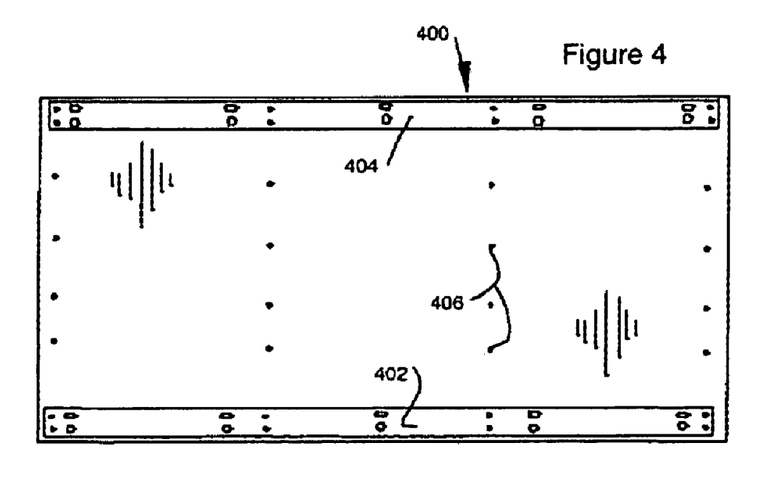
FIG. 4 is a schematic illustration of a pair of mounting rails on a rigid support member

In the case of steel studs, it is preferred to first secure to the studs, a panel indicated generally as 400. Roughly at least a half dozens screws can be used per stud. The upper rail 404 and the lower rail 402 are then secured to the panel as noted in regard to the embodiment of FIG. 1. The panel can be of any structural material, such as wood, and in particular, plywood.

Figure 6:
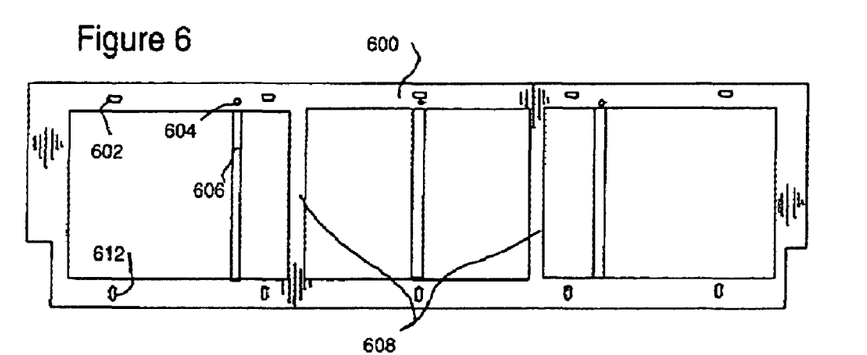
FIG. 6 is a schematic illustration of an embodiment of a rear frame member.

As shown in FIG. 6, the bolt receiving holes 602 in the upper section of the rear section of the frame 600 are horizontally elongated and the lower bolt receiving holes 612 are vertically oriented. The pattern can be reversed, if desired. Holes 604 are provided for the spacer bolts, as hereinafter explained. The vertical struts 606 and 608 serve to secure together, the upper and lower sections of the frame 600. Preferably, the frame 600 is formed of a plurality of welded angle members, rather than being formed in a single piece.

Figure 7:
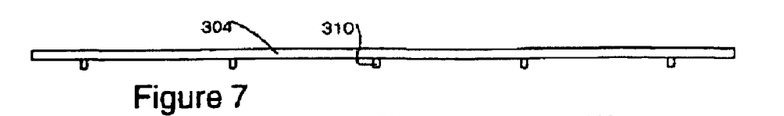
FIG. 7 is a schematic illustration of a top view of a rail of FIG. 3.

FIG. 7 is a top view of the rail 304 of FIG. 3. The bolts 310 pass through correspondingly positioned holes in the frame as illustrated in FIG. 10.

Figure 8:
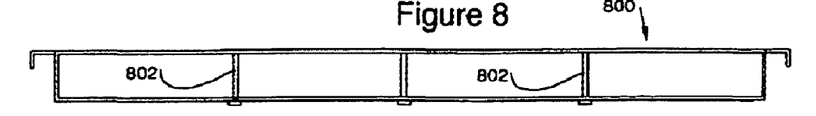
FIG. 8 is a schematic top view of a frame structure.

FIG. 8 shows the spacer bolts 802. The spacer bolts are not required at the bottom of the frame since the lower sections of the front and rear lower sections are secured together by an angle member. The term "angle member" as employed herein, is employed to indicate a metal sheet member that has a single or double bend. In the design of the frame of the present invention, the bends are provided in most instances for structural rigidity.

Figures 9, 10:
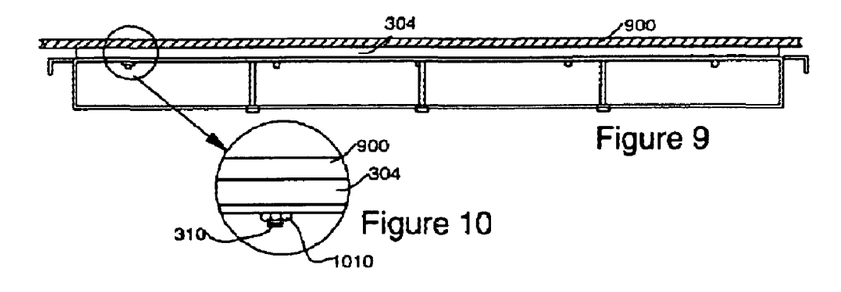
FIG. 9 is a schematic top view of the frame structure of FIG. 8 secured to the rail of FIG. 7, and mounted on a wall.
FIG. 10 is an enlarged view of the bolt section of the wall/rail/frame connection of FIG. 9.

As illustrated in FIG. 9, the rail 304 is secured to the wall 900. The rail 304 is secured to the frame by bolts 310. FIG. 10 shows, in enlarged form, a bolt containing section. The nut 1010 is threaded on to the bolt 310 thereby locking the frame to the rail, and to the wall. The decorative outer frame is provided with recesses to receive the bolt heads or nuts 1010.

Figure 12:
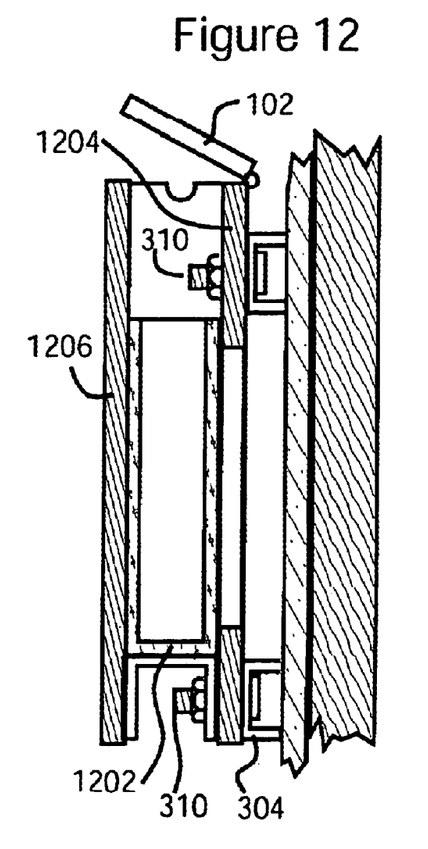
FIG. 12 is an end cross-sectional view showing a schematic representation of a still further embodiment of an attachment mechanism.

As shown in FIG. 12, the frame has a hinged top lid 102. Bolts 310 bolt the rear frame section 1204 to the rails 304. The front frame section 1206 is welded to right and left angle members, not shown, and to a bottom angle member. The frame can be a separate unitary component, or preferably, is formed in part by the right, left and bottom angle members.

Figure 11:
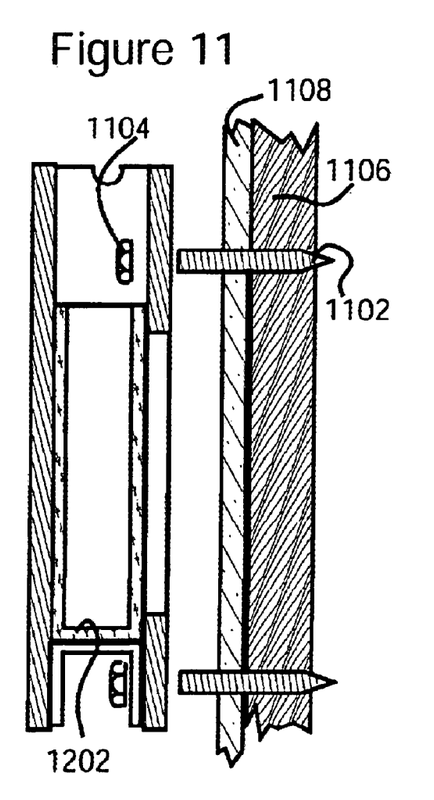
FIG. 11 is an end cross-sectional view showing a schematic representation of a further embodiment of an attachment mechanism.

FIG. 11 illustrates an alternate embodiment for securing the frame to the studs in the wall. In this design, bolts 1102 are driven into the studs and nuts 1104 are employed to secure the frame to the studs. Although this design employs fewer parts that the rail type of design, it is more difficult to install.

Figure 13:
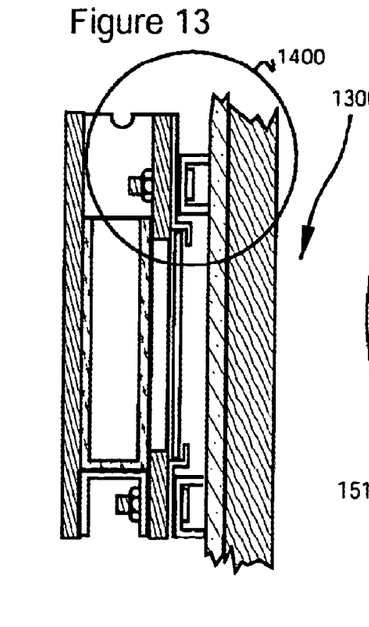
FIG. 13 is an end cross-sectional view showing a schematic representation of a still another embodiment of an attachment mechanism.

FIG. 13 shows an embodiment, indicated generally as 1300, for accommodating a removable picture or other display panel. The section 1400 is shown in enlarged form in FIG. 14. The rear frame element 1402 is secured to the stud 1414, indirectly, by being secured to the rail 1406, which in turn is directly fixed to the stud 1414 by means of a screw, preferably of stainless steel, that passes through the wall 1412 and penetrates the stud.

Figure 14:
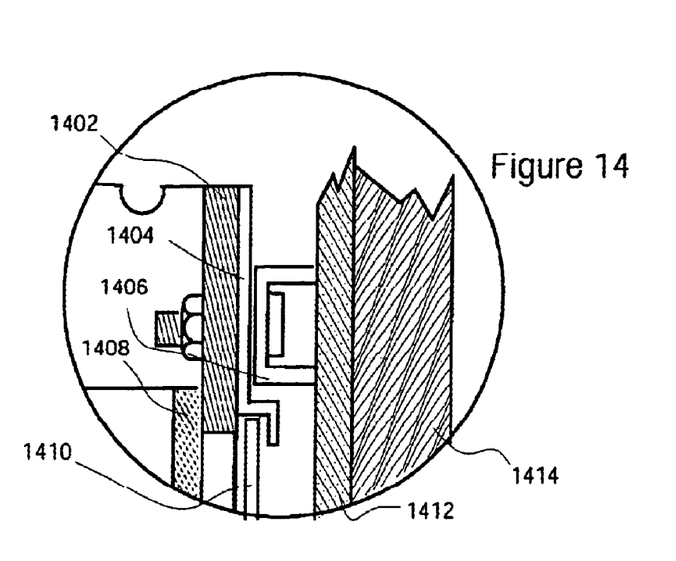
FIG. 14 is an enlarged view of the bolt section of the wall/rail/frame connection of FIG. 13.
Figure 15:
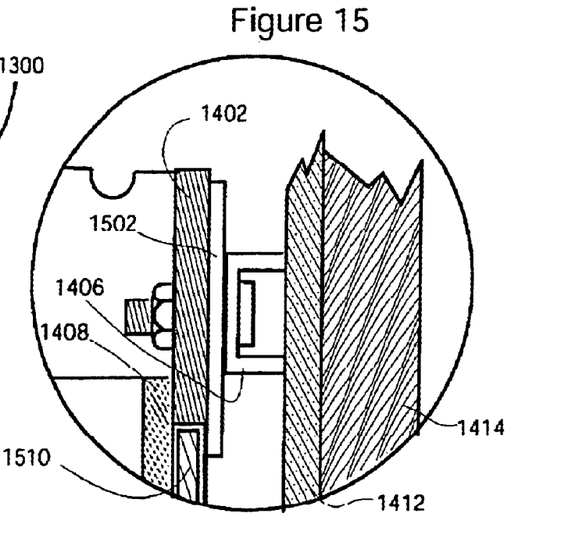
FIG. 15 is an enlarged view of the bolt section of a still further embodiment of the wall/rail/frame connection

An angle bracket 1404 is locked between the frame 1402 and the rail and provides a channel for the picture 1410. For rigidity purposes, the angle bracket 1404 is preferably welded to the frame 1402. FIG. 15 shows an alternate embodiment for providing a channel for the picture 1510, using a flat plate 1502 and employing a frame having a picture-receiving channel.

Figure 16:
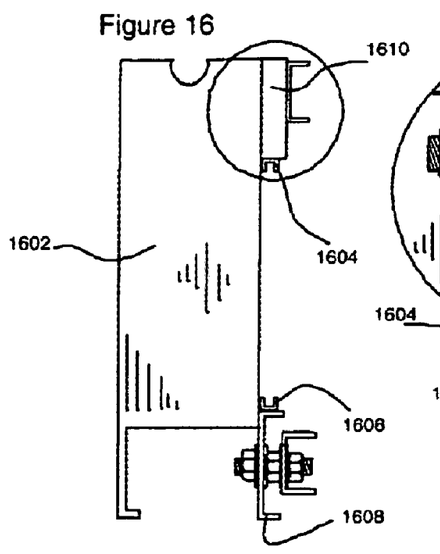
FIG. 16 is a schematic representation of an end view of an aquarium wall mounting system.

FIG. 16 shows a preferred embodiment in which a channel member 1604 is welded to the angle member 1610. The channel member 1604 provides a channel for a removable picture or display panel and provides requisite structural reinforcement. The side panel 1602 is shown as a solid member, but can have openings in order to reduce the weight of the frame. The lower channel member 1606 is show welded to the lower frame angle member 1608.

Figure 17:
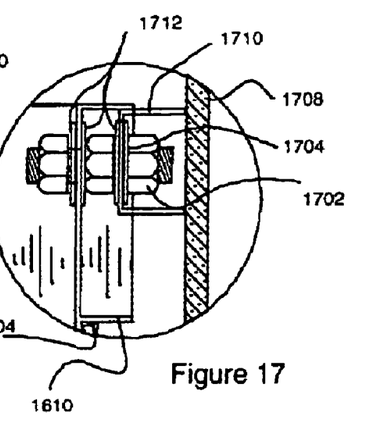
FIG. 17 is an enlarged view of the bolt section of the wall/rail/frame connection of FIG. 16

FIG. 17 shows the upper corner of the frame of FIG. 16, in enlarged form. The rail 1710, as previously noted, is secured to the studs in the wall 1708. The rail is bolted to the angle section 1610 of the frame. The bolting system includes three nuts, four washers and a threaded bolt. In a preferred embodiment, in place of a nut 1702, the bolt can be provided with an integral head.

Figure 18:
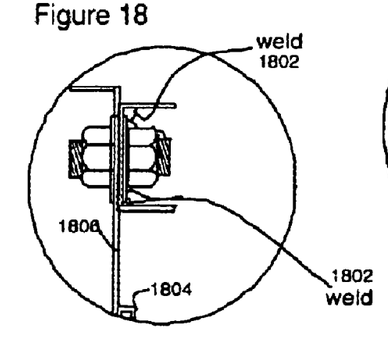
FIG. 18 is an enlarged view of another embodiment the bolt section of the wall/rail/frame connection.

FIG. 18 illustrates an embodiment in which a nut 1802 is welded to the rail and secured to the frame 1806 by a nut. The channel member 1804 provided a channel for the removable display member.

Figure 19:
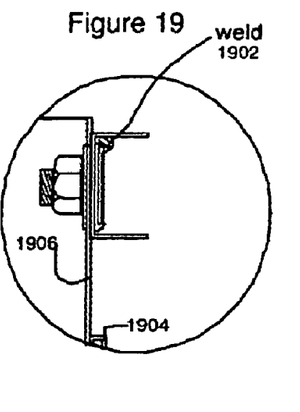
FIG. 19 is an enlarged view of still another embodiment the bolt section of the wall/rail/frame connection.

FIG. 19 illustrates an embodiment in which the bolt has an integral head that is welded 1902, to the rail member. The frame member 1906 carries a display panel-receiving channel 1904 that is welded to the frame member.

Figures 20, 23:
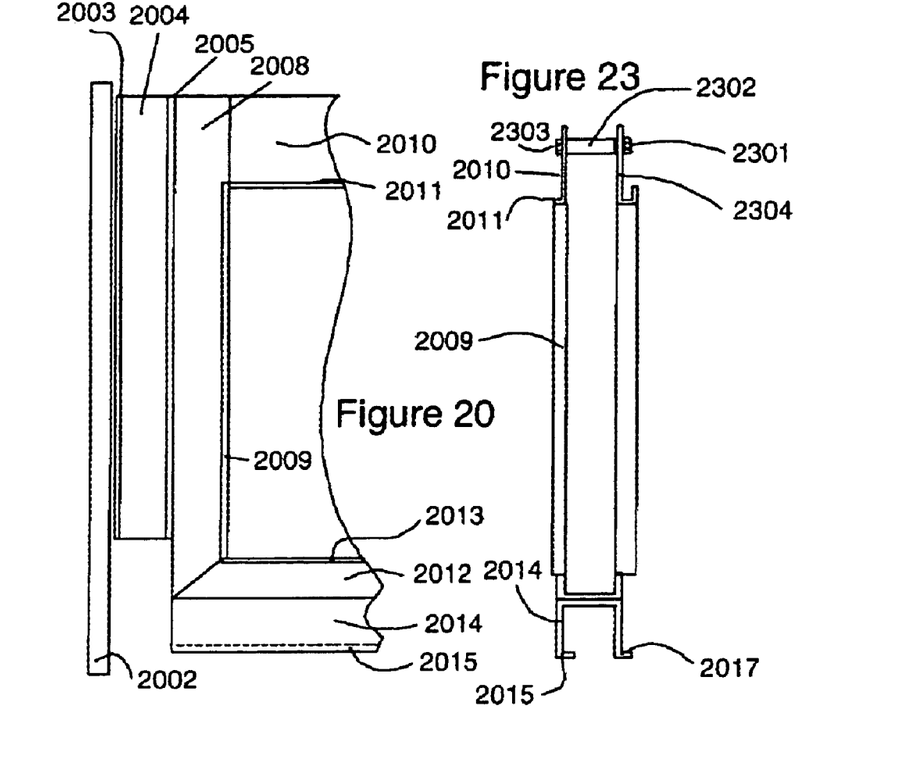
FIG. 20 is a fragmentary rear view of the left side of an aquarium wall mount system.
FIG. 23 is a schematic illustration of the end a wall mounting system.

FIG. 20 is a fragmentary rear view of the left side of an aquarium wall mount system. The hinged side door is shown as 2002 and the U channel 2004 is show to have two legs 2003 and 2005. The base of the U is in a plane parallel to the plane of the face of the aquarium and is welded to a U channel 2008. The U channel 2008 is welded to a mating U channel 2012. The right side of the frame structure is essentially a mirror image of the left side. The U channel 2008, its mirror image channel and the bottom channel 2012, in combination, form a U when viewed from the front. When combined with the front top frame element 2010 and the rear top frame element 2304, the channel members 2004, its mirror image member, and bottom channel 2012 form a picture frame structure that houses the aquarium. The amount of the frames overlap of the aquarium is on the order of one to two inches, thus framing the aquarium without significantly decreasing the visibility of the aquarium's face side. The minimum overlap is one half inch, as determined by structural strength requirements. The maximum overlap is limited by the desire to minimize the degree to which the aquarium face is blocked.

The bottom channel 2012 is welded to a structural lower channel 2014, which provides structural rigidity. Preferably, the lower channel 2014 is provided with right angle legs or flanges 2015 and 2017, for further rigidity. Similarly, the U channels 2008 (and its mirror image channel) and 2012 that frame the aquarium and the top frame elements 2010 and 2304 are also provided with right angle legs or flanges 2009, 2013 and 2011, respectively.

Figure 21:
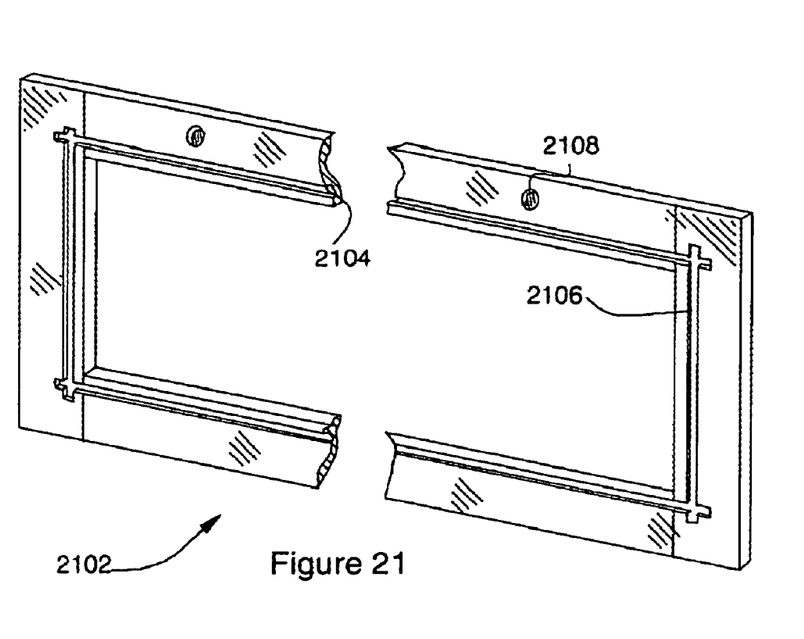
FIG. 21 is a rear view of a decorative frame member.

FIG. 21 is a rear view of a wooden decorative member, indicated generally as 2102 that is secured to the metal structural frame. In this embodiment, the frame has receiving recesses 2108 for receiving the heads or nuts 1010 of FIG. 10. The grooves 2104 and 2106 receive the angled ends of channel members that form the structural frame member.

Figure 22:
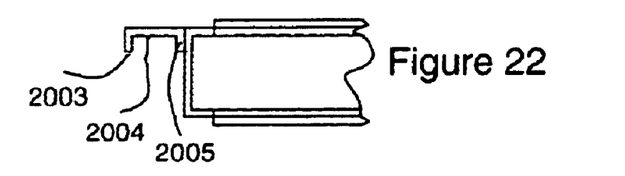
FIG. 22 is a top view of a portion of the system of FIG. 20.

FIG. 22 is a top view of a portion of the system of FIG. 20 and shows the side channel member 2004 that is welded to the U channel 2008. It is noted that when reference is made to the left side channels 2004 and 2008, the same conditions apply to the mirror image right side channels.

A spacer 2302 that is secured between the top frame elements separates the top frame elements 2010 and 2304. The spacer 2302 includes a threaded inner rod and hollow cylindrical element that houses the threaded inner rod. The threaded inner rod is bolted at each end to the top frame elements, by nuts 2303 and 2301. Thus, the top frame elements are locked together since the spacer precludes the frame elements from moving towards each other and the combination of the threaded rod and nuts, prevent the frame elements from moving apart.

Figure 25:
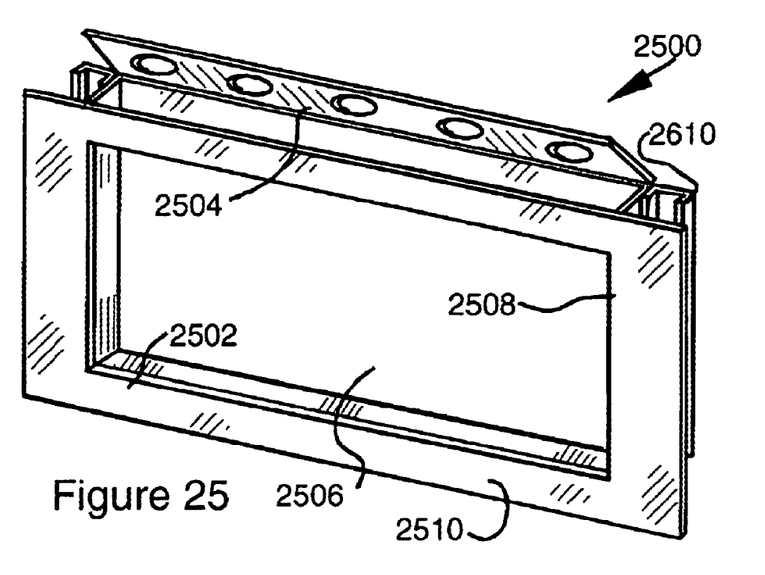
FIG. 25 is a schematic perspective view of a frame structure.

A schematic representation of the system is illustrated in FIG. 25 and indicated generally as 2500. The wooden frame 2502 functions as an aesthetic front panel or picture frame for the aquarium system. The hinged top panel is shown as 2504 and is shown with a plurality of vent holes. The aquarium 2506 is shown behind the decorative frame member 2502 and within the structural frame members.

Figures 24, 26:
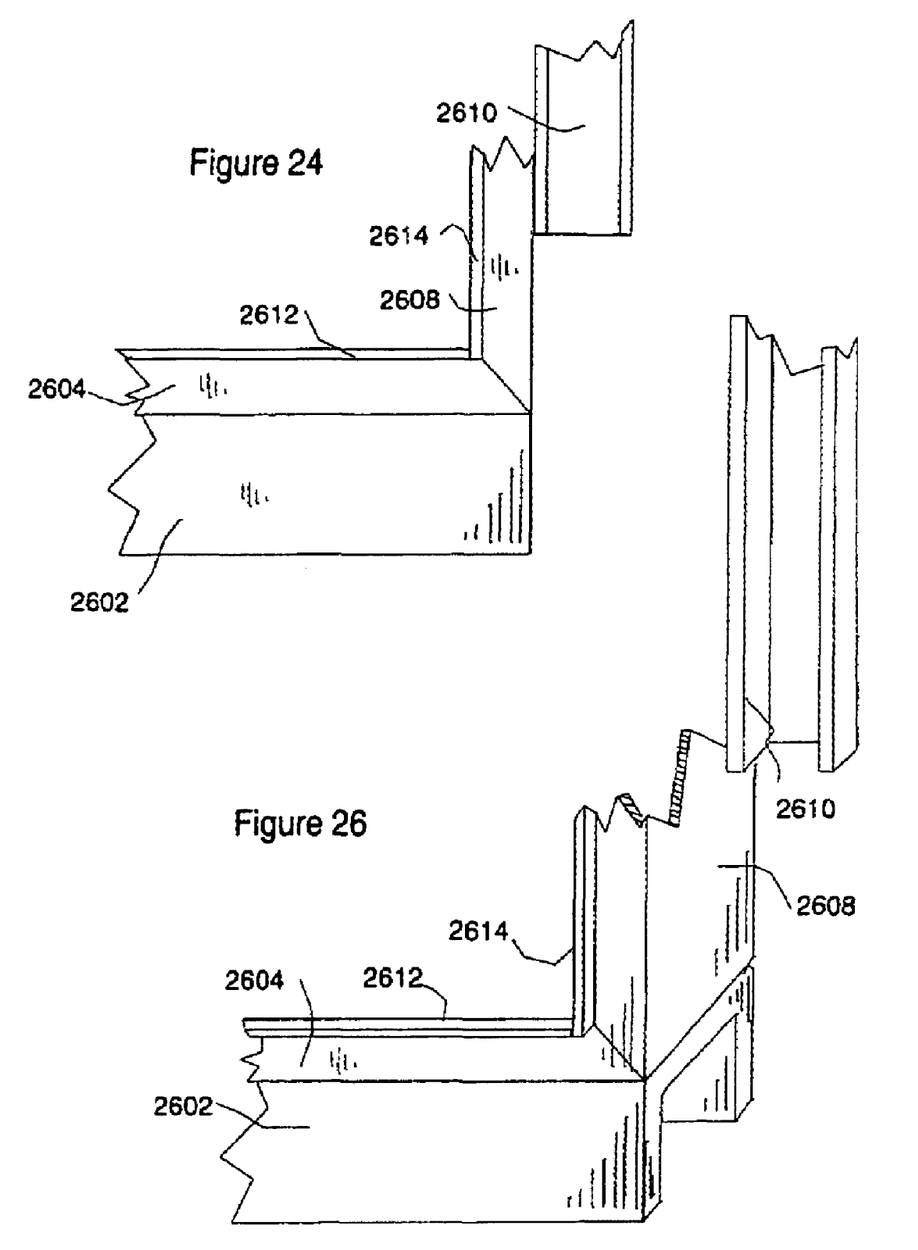
FIG. 24 is a fragmentary front view of the lower right corner of a frame structure.
FIG. 26 is a fragmentary perspective view of the lower right corner of the frame structure of FIG. 24.

The right corner of the system as illustrated in FIGS. 24 and 26 shows a bottom channel 2604, and a bottom structural channel 2602 secured to the bottom channel member 2604, as for example, by welding. The term right corner is used to indicate the section of the frame as viewed by an observer from the front. The inwardly open side channel member 2608 has a flange portion 2614 and is secured, as for example by welding, to a front open side channel member 2610.

The downwardly open bottom channel member 2602 is secured, as for example by welding, to the upwardly open bottom channel member 2604. The inwardly open side channel 2608 and upwardly open bottom channel member 2604 are shown to have flange members 2612 and 2614 respectively. The wooden facing member is provided with grooves to accommodate the various flange members. It should be understood that while reference is made to a wooden frame, other aesthetically appealing materials can be used, such as plastics and metals.

What is claimed is:

1. A wall mounted aquarium, comprising a structural material frame and a glass aquarium mounted within said structural metal frame,
    said structural metal frame having a front side and a rear side, and comprising
        a pair of vertical "U" shaped channel members,
        a horizontal "U" shaped channel member,
            said pair of vertical "U" shaped channel members and said horizontal "U" shaped channel members being bonded together to form a "U" shaped frame unit, a pair of vertically positioned upper planar members, each of said vertically positioned upper planar members having a pair of horizontally elongated side and a pair of vertical sides, each planar member having each vertical side bonded to a "U" shaped channel member,
        said glass aquarium having five sides and an open top end, one of said sides being a front side, one of said sides being a bottom side, one of said sides being a rear side and two of said sides being ends,
            each of said planar members being spaced apart a distance sufficient for the aquarium to be positioned between said pair of upper planar members.

2. The wall mounted aquarium of claim 1, wherein said structural material is metal, and further comprising a second set of three channel members,
    each of said three channel members being bonded to one of said pair of vertical "U" shaped channel member and said horizontal "U" shaped channel member,
    in combination with an upper planar member forming a picture frame and situated to overly said face side of said aquarium.

3. The wall mounted aquarium of claim 2, wherein said pair of vertical "U" shaped channel members and said horizontal "U" shaped channel member opening inwardly and at least one of said second set of three channel members open outwardly.

4. The wall mounted aquarium of claim 3, wherein a pair of said second set of channel members open toward the face of the wall mounted aquarium and one of said second set of channel members opens downwardly.

5. The wall-mounted aquarium of claim 3, further comprising a decorative frame member, said decorative frame member being fixed to said structural metal frame member.

6. The wall mounted aquarium of claim 5, wherein said decorative frame member has a plurality of elongated grooves, each of said elongated grooves being dimensioned and positioned to receive one flange element.

7. The wall mounted aquarium of claim 1, wherein components of said structural material frame are metal welded together to form a unitary structure.

8. The wall mounted aquarium of claim 1, further comprising a pair of horizontally positioned "U" shaped decorative panel receiving members, said decorative panel receiving members being fixed to said structural frame rear side,
    said "U" shaped decorative panel receiving members having the open ends of the "U"s facing each other and positioned and dimensioned to receiving a decorative panel member,
    and a decorative panel member removably positioned within said U shaped decorative panel receiving members.

9. The wall mounted aquarium of claim 8, wherein said pair of "U" shaped decorative panel receiving members are welded to said structural material frame thereby rigidifying said frame.

10. The wall-mounted aquarium of claim 1, further comprising at least one of an air pump and a filter pump mounted in one of said "U" shaped channel members.

11. The wall mounted aquarium of claim 10, and further comprising at least a pair of hinged door members mounted relative to at least two of said "U" shaped channel members to form enclosed chambers.

12. The wall mounted aquarium of claim 1, further comprising a plurality of spacer elements positioned between said pair of planar members and fixing said planar members at a pre-determined separation distance.

13. The wall mounted aquarium of claim 12, wherein each of said spacer elements have a first end affixed to the rear side of said structural metal frame and a second end affixed to the front side of said structural metal frame, at a position proximate the open top end of said glass aquarium, whereby the open end of said aquarium is protected against flexure forces.

14. The wall mounted aquarium of claim 1, wherein said aquarium has an inside width dimensions of between 3.5 and 4.5 inches, by at least two feet, by at least three feet and said aquarium has a capacity of at least about 20 gallons.

15. The wall mounted aquarium of claim 14, wherein said aquarium has a capacity of at least about 30 gallons and said aquarium has a length of at least six feet.

16. A wall mounted aquarium, comprising a glass aquarium and a rectangular structural metal six sided frame dimensioned for mounting said glass aquarium within said structural metal frame, said aquarium having a weight in excess of several hundreds pounds when filled with water,
    said structural metal frame having a front side and a rear side, and comprising;
        at least a pair of vertical channel members,
        a horizontal channel member,
            said pair of vertical channel members and said horizontal channel members being bonded together to form a "U" shaped frame unit,
        a pair of upper vertical plane members,
            each of said vertical plane members having a pair of horizontally elongated sides and a pair of vertical ends, and
            each planar member having each vertical end bonded to a channel member.

17. The wall mounted aquarium of claim 16, further comprising a plurality of spacer members positioned between said pair of vertical plane members, and fixed to said vertical plane members and maintaining said vertical plane members spaced apart by a fixed predetermined distance, thereby rigidifying said vertical plane members against flexure.

18. The wall mounted aquarium of claim 17, wherein each spacer member comprises a threaded rod and a plurality of nuts,
   at least a pair of nuts cooperating to maintain said vertical plane members spaced apart by a minimum distance and
   a pair of nuts cooperating to maintain said vertical plane members spaced apart at a maximum distance.

19. The wall-mounted aquarium of claim 16, wherein said channel members are "U" shaped.

20. The wall mounted aquarium of claim 16, wherein said at least one of said channel members is a rectangular tube.

21. The wall mounted aquarium of claim 16, further comprising a pair of mounting rails,
   each of said mounting rails being "U" shaped members having a pair of legs, an open end and a closed end,
   said mounting rails being threadedly connected to a wall and
   a plurality of threaded rods fixed at one end to one of said mounting rails and affixed with a pair of opposing nuts to said structural metal frame.

22. The wall mounted aquarium of claim 21, wherein said plurality of threaded rods comprise a plurality of spacer members positioned between said pair of vertical plane members, said spacer members being fixed to said vertical plane members and maintaining said vertical plane members spaced apart by a fixed predetermined distance, thereby rigidifying said vertical plane members against flexure.

23. The wall mounted aquarium of claim 22, further comprising
   at least a first pair of nuts, said first pair of nuts cooperating to maintain said vertical plane members spaced apart by a minimum distance and
   a second pair of nuts, said second pair of nuts cooperating to maintain said vertical plane members spaced apart at a maximum distance.

24. An aquarium mounted on a wall, comprising
   a rectangular structural metal frame dimensioned for mounting a glass aquarium within said structural metal frame,
   a glass aquarium,
      said aquarium having a weight in excess of several hundreds pounds when filled with water,
      said structural metal frame having a front side and a rear side, and comprising
         at least a pair of vertical channel members,
         a horizontal channel member,
            said pair of vertical channel members and said horizontal channel members being bonded together to form a "U" shaped frame unit,
         a pair of upper vertical plane members,
            each of said vertical plane members having a pair of horizontally elongated sides and a pair of vertical sides,
            each planar member having each vertical side bonded to a channel member,
      a pair of mounting rails, each of said mounting rails being "U" shaped members having
         a pair of legs, an open end and a closed end,
            said mounting rails being threadedly connected to said wall,
         a plurality of threaded rods,
            said plurality of threaded rods being fixed at one end to one of said mounting rails and affixed with two pairs of nuts to said structural metal frame.

25. The wall mounted aquarium of claim 24, wherein said plurality of threaded rods further comprise;
   a plurality of spacer members,
      said plurality of spacer members being positioned between said pair of vertical plane members and fixed to said vertical plane members,
      thereby maintaining said vertical plane members spaced apart by a fixed predetermined distance and rigidifying said vertical plane members against flexure
   at least a first pair of nuts,
      said at least a pair of nuts cooperating to maintain said vertical plane members spaced apart by a minimum distance,
   and a second pair of nuts,
      said second pair of nuts being in a position on said threaded rods to cooperate to maintain said vertical plane members spaced apart at a maximum distance.

26. The wall mounted aquarium of claim 25, wherein said channel members have a pair of leg sections and a base section, in combination having a "U" shaped.

27. The wall mounted aquarium of claim 26, wherein said at least one of said channel members is a rectangular tube.

28. The wall mounted aquarium of claim 27, wherein said at least a plurality of said channel members are rectangular tubes.

29. The wall mounted aquarium of claim 24, further comprising a decorative frame member, said decorative frame member being fixed to said front side of said structural metal frame member.

30. The wall mounted aquarium of claim 24, wherein said aquarium has outside dimensions of between 3.5 and 4.5 inches, by at least two feet, by at least three feet and said aquarium has a capacity of at least 30 gallons.

31. The wall mounted aquarium of claim 30, wherein said aquarium has a capacity of at least 35 gallons and said aquarium has a length of at least six feet.

32. The wall mounted aquarium of claim 29, wherein said decorative frame member has an outer dimension greater than the outside dimension of said structural frame and has a width of at least 6.5 feet.

* * * * *